United States Patent [19]
Senft

[11] Patent Number: 5,391,249
[45] Date of Patent: Feb. 21, 1995

[54] METHOD AND APPARATUS FOR PRODUCING INTERNALLY APERTURED PRESSURE-SENSITIVE LABELS

[75] Inventor: Richard E. Senft, Jefferson Borough, Pa.

[73] Assignee: Uarco Incorporated, Barrington, Ill.

[21] Appl. No.: 143,663

[22] Filed: Nov. 1, 1993

[51] Int. Cl.⁶ .............................................. B32B 31/00
[52] U.S. Cl. ................................. 156/248; 156/249; 156/267; 156/268; 156/270; 156/510; 156/513; 156/543
[58] Field of Search ............... 156/248, 249, 257, 268, 156/510, 513, 514, 519, 543, 269, 270

[56] References Cited
U.S. PATENT DOCUMENTS

| | | | |
|---|---|---|---|
| 4,328,057 | 5/1982 | Gutow | 156/248 |
| 4,599,125 | 7/1986 | Buck | 156/248 |

Primary Examiner—David A. Simmons
Assistant Examiner—M. Curtis Mayes
Attorney, Agent, or Firm—Charles J. Long

[57] ABSTRACT

A method and apparatus for producing internally apertured pressure-sensitive labels adhered to a non-apertured liner begins with a label web adhered to a first liner. The internal aperture shapes are cut through the web only and not through the liner, forming aperture slugs separate from the web. The first liner is then removed from the web, and the separate aperture slugs adhere to and are removed with the liner. Next, the web, with apertures cut out, is adhered to a second liner and the label peripheries, in registry with the apertures, are cut through the web only and not through the liner, forming labels separate from the web. Finally, the web is removed from the second liner, leaving individually internally apertured labels on the non-apertured second liner.

6 Claims, 2 Drawing Sheets

METHOD AND APPARATUS FOR PRODUCING INTERNALLY APERTURED PRESSURE-SENSITIVE LABELS

BACKGROUND OF THE INVENTION

1. Field of the Invention

This invention relates to internally apertured pressure-sensitive labels. More particularly, the invention relates to a method and apparatus for producing such labels adhered to a nonapertured liner.

2. Description of the prior art

Production of pressure-sensitive labels normally begins with a continuous flexible web of label material, which may for example be of film or coated paper, adhered to a coextensive continuous flexible liner, again of paper or film, by a pressure-sensitive adhesive which remains with the label web if the web is removed from the liner. The amount of force required to remove the labels from the liner is known as the release force, and is determined by the particular combination of web material, liner material and adhesive used, as is known to those skilled in the art. By suitable selection of web liner and adhesive, the release force can be varied to suit the label user's needs.

In the field of pressure-sensitive labels, there is an increasing demand for internally apertured labels—i.e. labels with one or more cut out areas within each label's perimeter. Heretofore the most common method of making such labels has been to die cut the aperture shapes through both the web and the liner, thereby forming separate aperture slugs consisting of both label material and liner material, and remove the cut out aperture slugs by suitable means. Buck U.S. Pat. No. 4,599,125 teaches a similar method and apparatus for producing pressure-sensitive reinforcing rings. In the Buck method, a first die cuts the circular shape of both the exteriors of the rings and the single central holes in each through the web but not the liner; the web surrounding the rings is then removed, leaving on the liner the rings and a separate central circular web slug in each. A second die then makes a central circular cut, of smaller diameter than the central circular web slug, through the liner under each ring only but not through the web, producing a circular liner slug to which the circular web slug is adhered. The web/liner slugs are then removed by a mechanical "picker" and disposed of suitably, for example through a vacuum hose. The resulting product includes a liner with separate pressure-sensitive reinforcing rings adhered thereto and with a hole through the liner concentric with the hole in each ring.

The main problem with methods such as taught by Buck—i.e. where the liner has open apertures under each of the label apertures, becomes evident automatic label dispensing operations. In such operations the label-containing web is fed from a supply roll to a point where the labels are to be applied to, e.g., containers which are passing the attachment point at a certain speed. Typically, at the attachment point the liner is caused to sharply change directions by passing it over a small radius rod or "breaker"; also at that point an appropriate blade-like member is often positioned to catch and lift the leading edge of each label as it arrives, with the result that the label is lifted from the liner and travels in an essentially straight path to the container surface where it is adhered by a suitable roller or the like. In very high speed dispensing operations, the presence of holes in the liner increases the likelihood of liner tearing at the separation point, for example because a corner in a hole acts as a stress raiser, or because a trailing edge of a hole lifts during the sharp bend of the liner and is caught by the label-separating blade. Moreover, where the labels and liner include a number of adjacent holes with only thin sections of material between them, the liner may not separate from the label at the thin sections, but instead a small piece of liner may tear loose and travel with the label, which causes improper adhesion of the label to the article to which it is applied.

The above-mentioned problems can largely be eliminated by providing internally apertured labels on a non-apertured liner. The basic cutting mechanisms of such a process are known; they simply include die cutting both the label periphery and the internal aperture shapes through the web but not through the liner. However, removal of the cut-out internal aperture slugs thus formed has proved problematic. It is, of course, possible to remove the slugs by hand if extremely slow production speed and high costs can be tolerated; where a label includes a number of small internal apertures, such drawbacks would naturally be exacerbated in a manual operation.

Gutow U.S. Pat. No. 4,328,057 discloses a mechanized method and apparatus for producing internally apertured pressure-sensitive labels on a non-apertured liner which improves the speed and economy of production, but it also presents problems. In Gutow a first die cuts the aperture shape through the web only and not through the liner, forming a separate aperture slug. The web/liner then travels to and over a breaker, at which point the aperture slug lifts from the liner and is removed, via a nozzle and conduit, by a vacuum cyclone separator; the remaining web and liner are guided around suitable guide rollers to a second die, which cuts the outer periphery of the label through only the web, and thence to a take-up point where the "ladder" of scrap web surrounding the label is removed, leaving the liner with only the labels attached. In order to minimize adhesion of the removed aperture slugs to one another or the vacuum conduit, Gutow applies a silicone oil spray to the slugs as they enter the vacuum nozzle.

The Gutow method does produce internally apertured pressure-sensitive labels on a non-apertured web, but it is has several shortcomings. First, the length of travel path required between the aperture cut point and the periphery cut point because of the need to pass the web/liner over the breaker, coupled with the bends undergone by the web/liner in travelling that path, can cause a loss of precision in registry between the aperture location(s) and the label periphery; such loss of precision may be acceptable in producing a label design having a single relatively large and regularly-shaped aperture, but can be fatal where a number of small and/or precisely located apertures are required in the label. Second, Gutow's use of a silicone oil mist coating and vacuum removal of the aperture slugs not only requires two added sets of delivery and/or conduit systems, one for the oil and one for the vacuum, but also would likely be messy and ineffective for a label design having a plurality of small aperture slugs to remove. Finally, the Gutow slug removal system does not lend itself to high speed production of multi-apertured pressure-sensitive labels where the aperture sizes are small and/or varied.

In view of the foregoing, a need exists for a method and apparatus that can produce internally apertured pressure-sensitive labels adhered to a non-apertured liner at high rates of production.

SUMMARY OF THE INVENTION

I have found that internally apertured pressure-sensitive labels can be produced on a non-apertured liner at high rates by die cutting the apertures through only the web while the web is adhered to a first liner, removing the first liner, with aperture slugs adhering thereto, from the web, and applying a second liner for the balance of the production process.

In accordance with the invention, I provide a method of making internally apertured pressure-sensitive labels removably adhered to a continuous flexible non-apertured liner, comprising the following steps in the order listed: (a) providing a continuous flexible label web removably adhered by a pressure-sensitive adhesive to a continuous flexible first liner selected such that (i) a first release force is required to separate the label web from the first liner and (ii) upon such separation the pressure-sensitive adhesive remains with the label web; (b) cutting the borders of the internal apertures in proper registry for each label through the label web but not through the first liner, thereby forming aperture slugs separate from the label web; (c) removing the first liner, with the aperture slugs adhering thereto, from the label web; (d) removably adhering the label web to a continuous flexible second liner selected such that (i) a second release force is required to remove the label web from the second liner and (ii) upon such removal the pressure-sensitive adhesive remains with the label web; (e) cutting the external peripheries of the labels through the label web but not through the second liner, thereby forming individual labels separate from the label web; and (f) removing the label web from the second liner, thereby leaving individual internally apertured labels removably adhered to the second liner.

Preferably the label web is maintained in one plane between the aperture cutting step and the external periphery cutting step.

In a preferred method, the cutting steps are accomplished by using rotating cylindrical cutting dies, such as are common in the pressure-sensitive label field.

In a method where the distance between cutting steps is minimized, the axes of the two cylindrical dies are separated by a distance no greater than the sum of the diameters of the two dies.

Preferably the first and second liners are selected such that the first release force is greater than the second release force.

In further accordance with the invention, I provide apparatus for producing internally apertured pressure-sensitive labels removably adhered to a continuous flexible non-apertured liner, comprising: (a) means for advancing to a first cutting station a continuous flexible web removably adhered to a continuous flexible first liner; (b) apertured cutting means at the first cutting station for defining at least one aperture for each label by cutting through the label web only but not through the first liner to thereby produce aperture slugs separate from the label web; (c) means for removing the first liner with the aperture slugs adhered thereto from the label web by advancing the label web in a first plane and the first liner in a second plane which diverges from the first plane; (d) means for bringing a continuous flexible second liner into removably adherent contact with the label web after the first liner and aperture slugs have been removed from the label web; (e) means for advancing the label web and adhered second liner to a second cutting station; (f) periphery cutting means at the second cutting station for defining the peripheral shape of each label by cutting through the label web only but not through the liner, to thereby form individual labels separate from the label web; and (g) means for removing the label web from the second liner to thereby leave the individual labels adhered to the second liner.

My method and apparatus overcome the disadvantages of prior approaches and enable high-speed production of internally apertured pressure-sensitive labels on a non-apertured liner which is well suited to high-speed label application processes.

Other details, objects, and advantages will be come apparent as the following description of a present preferred embodiment thereof and a present preferred method of practicing the same proceeds.

BRIEF DESCRIPTION OF THE DRAWINGS

In the accompanying drawings I have shown a present preferred embodiment of the invention and have illustrated a present preferred method of practicing the same in which.

DESCRIPTION OF THE PREFERRED EMBODIMENT

Figure 1:
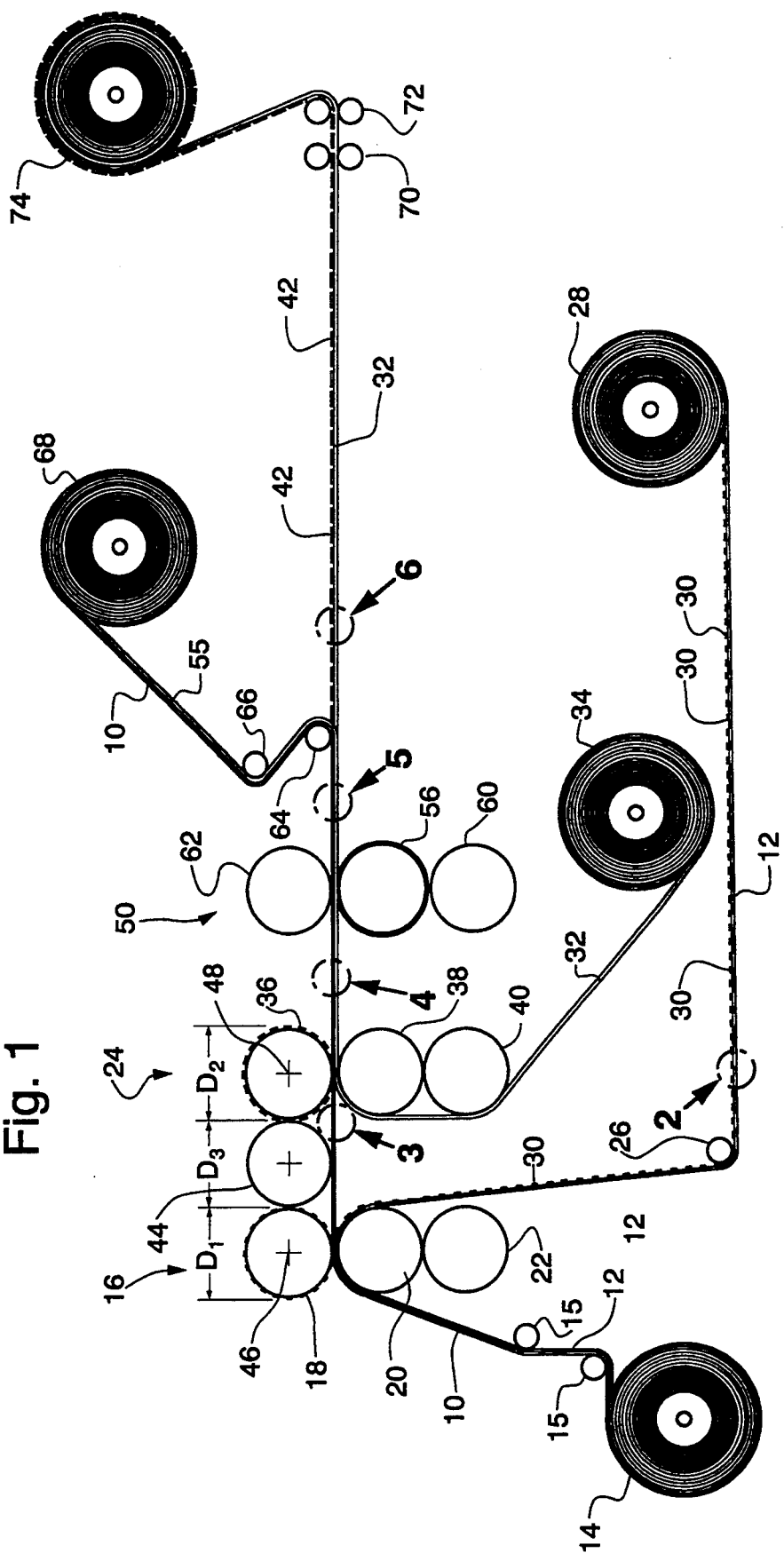
FIG. 1 is a schematic diagram of the apparatus for producing internally apertured pressure-sensitive labels according to the invention.

Referring to the drawing figures, a continuous flexible label web 10 adhered by a pressure-sensitive adhesive to a continuous flexible first liner 12 is advanced from a supply reel 14 over guide rolls 15 to a first cutting station 16. The specific materials used for the label web and the pressure-sensitive adhesive are generally dictated by end-user requirements for the labels to be produced, as is known to those skilled in the art; a wide variety of paper and plastic films are used for labels and adhesives may be solvent-, rubber-, or acrylic-based. The first liner is commonly a paper sheet having on its adhesive-receiving surface a silicone release coating formulated to require a first release force for removal of the web from the liner and to insure that on such removal the pressure-sensitive adhesive stays with the web rather than remaining on the liner.

Between the supply reel 14 and the first cutting station 16 other operations such as printing the label web may optionally be carried out; however, for simplicity and since such operations form no part of my invention, FIG. 1 does not show any such optional steps.

At the first cutting station 16 is a first cylindrical cutting die 18 designed to cut internal label aperture shapes in proper registry for the ultimate labels. The die 18 is positioned with respect to a first support or anvil roll 20 so as to provide a die cut through only the label web but not through the liner; such cuts are commonly referred to as "kiss" cuts, and the mechanics of producing them are well known in the pressure-sensitive label-making art. Anvil roll 20 is supported from below by a first backup roll 22 which provides additional rigidity to the roll arrangement for precision in the kiss cut. As the web 10/first liner 12 combination is advanced the cutting die 18 and anvil roll 20 rotate to form aperture slugs separate from the label web.

Figure 2:
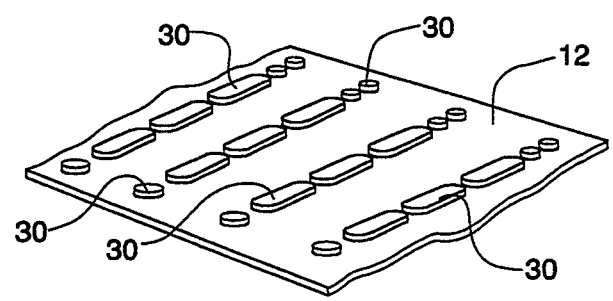
FIG. 2 shows the first liner with aperture slugs adhered thereto as it appears at location 2 of FIG. 1.
Figure 3:
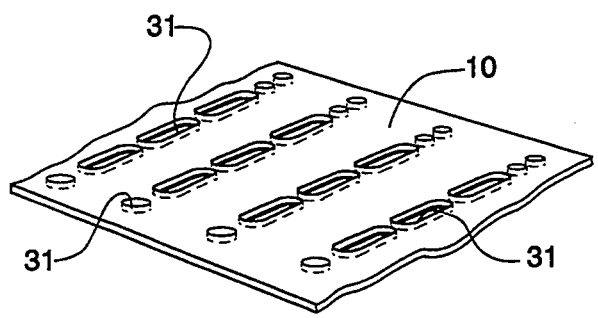
FIG. 3 shows the label web as it appears at location 3 of FIG. 1.

After cutting of the aperture slugs, the first liner 12 is removed from the label web 10 by advancing the liner in a plane which diverges from the plane of the web, as shown in FIG. 1, in which embodiment the label web 10 is advanced horizontally toward a second cutting station 24 and the liner 12 is fed downwardly around a guide roll 26 and from there to a powered take-up reel 28 for subsequent disposal. Upon such removal the aperture slugs 30, which are now separate from the web, remain with the liner 12 as shown in the view of FIG. 2 taken at location 2 of FIG. 1, leaving label web 10 with apertures 31 as shown in the view of FIG. 3 taken at location 3 of FIG. 1.

As the apertured label web 10 arrives at the second station 24 it is met by and adhered to a second liner 32 fed from a supply reel 34. The second liner 32 is, like the first liner 12, generally a paper sheet and has on its adhesive-receiving surface a release coating formulated to require a second release force for removal of the web from the liner and to insure that on removal the pressure-sensitive adhesive stays with the label web. Although the relationship between the first and second release forces is frequently not critical, I generally prefer to select a second liner having a second release force lower than the first release force.

Figure 4:
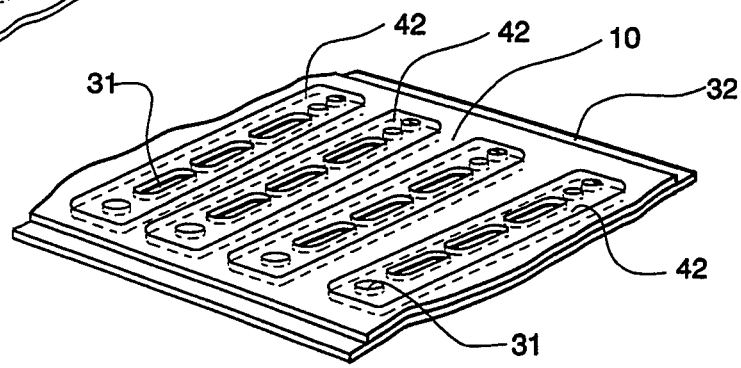
FIG. 4 shows the label web adhered to the second liner as the combination appears at location 4 of FIG. 1.

At the second cutting station 24 are a second cylindrical cutting die 36, a second anvil roll 38 and a second back-up roll 40, all functioning substantially as their counterparts do at the first cutting station, except that die 36 is designed to kiss cut the external peripheries of the labels through the web 10 but not through the second liner 32, thereby forming individual labels separate from the web 10. In the embodiment of FIG. 1, adherence of the second liner 32 to the web 10 is effected by feeding the second liner around back-up roll 40 and anvil roll 38 and pressing the web and liner together between die 36 and anvil roll 38 at substantially the same point that cutting of the label peripheries occurs. FIG. 4 shows the web 10/second liner 32 composite at location 4 of FIG. 1, i.e., after it exits the second cutting station; the individual labels 42 having internal apertures 31 are separated from the web 10 but both web and labels are still adhered to the second liner 32.

It will be appreciated that it is critical to maintain registry between the internal apertures cut at the first cutting station and the label peripheries cut at the second cutting station. I have found that such registry is best maintained by (a) restricting the travel path of the unsupported (i.e., liner-free) web to a single plane between the first and second cutting stations, (b) minimizing the distance between the first and second cutting stations to minimize the possibility of stretching in the unsupported web, and (c) suitably interconnecting the first die 18 and second die 36 so that one die drives the other, to eliminate backlash or gear play which could occur with independently driven dies. I prefer to position the first and second cutting stations so that the axes of the first and second cylindrical cutting dies are spaced apart by no more than the sum of their diameters, and to provide an idler gear meshing with both dies so that one die drives the other. One useful arrangement of this type is shown in FIG. 1, in which cutting die 18 has diameter $D_1$ and cutting die 36 has diameter $D_2$. Circular drive gears having equal tooth geometry, not shown, are attached to both dies and an idler gear 44 having diameter $D_3$ is mounted between and engages the gears on both dies. Typically die 18 is powered and drives die 36 through idler gear 44, but other arrangements would also work, such as powering die 44 and having it drive die 18. In the embodiment shown, all three diameters $D_1$, $D_2$ and $D_3$ are equal, such that the distance from the axis 46 of die 18 to the axis 48 of die 36, i.e. the radius of each die plus the diameter of the idler gear, is in this case equal to the sum of the cutting die diameters. The axial spacing of the first and second cutting dies can of course be reduced further by using an idler gear of smaller diameter, and it may be necessary or desirable in some cases to use first and second cutting dies of different diameters; regardless of the size relationships, however, the axis-to-axis spacing of the first and second cutting dies should preferably be no more than the sum of their diameters.

Figure 5:
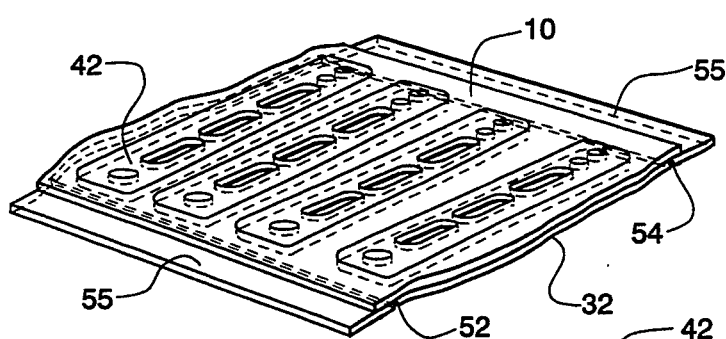
FIG. 5 shows the label web/second liner combination as it appears at location 5 of FIG. 1.

Although not a required part of my invention, I generally add a third cutting station 50 at which the final width of liner 32 is precisely fixed to enhance lateral positional control of the finished label-carrying liner when it is used in high-speed label applying equipment. At cutting station 50 two kiss cuts are made through the liner only but not through the overlying web by a third rotating cylindrical cutting die 56 having circumferential cutting blades, only one of which is visible in FIG. 1, spaced apart by the final width of the liner 32. Cutting die 56 receives added support from back-up roll 60, and top-mounted anvil roll 62 serves the normal function of such rolls in die-cutting operations. The final liner width is normally set at less that the web width, for reasons which will become apparent. FIG. 5 shows the web/liner/label composite at location 5 of FIG. 1, after the liner has been cut to width by kiss cuts 52 and 54; such cuts produce scrap liner strips 55 separate from and on both sides of usable liner 32.

Figure 6:
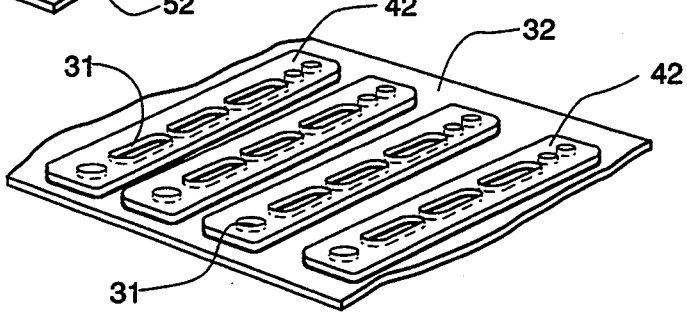
FIG. 6 show the final product of my method and apparatus as it appears at location 6 of FIG. 1.

As the final step in producing internally apertured labels with the method and apparatus of my invention, the label web 10 surrounding labels 42 is removed from the second liner 32, leaving the individual internally apertured labels 42 on the non-apertured liner 32; FIG. 6 shows the finished product at location 6 of FIG. 1.

When the liner has been kiss cut to width as shown in FIGS. 1 and 5, the separate liner portions beyond the final width adhere to and are removed with the web, as indicated in FIG. 1. A powered take-up reel 68 pulls the web 10 and scrap liner 55 away from the labels and sized liner and around guide rolls 64 and 66, while the label-carrying liner is advanced in a straight path through guide roll pairs 70 and 72 and onto a powered finished take-up reel 74. Take-up reel 68, aided to varying degrees by the rotating members at the cutting stations, provides means for advancing the web 10 through the apparatus, while concomitant advancement of the first and second liners is accomplished by take-up reels 28 and 74 respectively.

Many of the mechanical components in my apparatus are of types and functions commonly known in the label-making art, and selection and arrangement thereof are believed to be within the skill of that art. Examples of such components would be drive and support arrangements for the various take-up reels and dies (with the exception of the preferred drive arrangement for the first and second cutting dies 18 and 36, as discussed herein).

While I have shown and described a present preferred embodiment of the invention and have illustrated a present preferred method of practicing the same, it is to be distinctly understood that the invention is not limited thereto but may be otherwise variously embodied and practiced within the scope of the following claims.

I claim:

1. A method of making internally apertured pressure-sensitive labels removably adhered to a continuous flexible non-apertured liner, comprising the following steps in the order listed:
   a). providing a continuous flexible label web removably adhered by a pressure-sensitive adhesive to a continuous flexible first liner selected such that (i) a first release force is required to separate the label web from the first liner and (ii) upon such separation the pressure-sensitive adhesive remains with the label web;
   b). cutting the borders of the internal apertures in proper registry for each label through the label web but not through the first liner, thereby forming aperture slugs separate from the label web;
   c). removing the first liner, with the aperture slugs adhering thereto, from the label web;
   d). removably adhering the label web to a continuous flexible second liner selected such that (i) a second release force is required to remove the label web from the second liner and (ii) upon such removal the pressure-sensitive adhesive remains with the label web;
   e). cutting the external peripheries of the labels through the label web but not through the second liner, thereby forming individual labels separate from the label web; and
   f). removing the label web from the second liner, thereby leaving individual internally apertured labels removably adhered to the second liner.

2. The method of claim 1, including the step of maintaining the label web in one plane between the two cutting steps.

3. The method of claim 2 in which each of the two cutting steps includes the steps of providing a cylindrical cutting die and rotating the cylindrical cutting die about its axis to accomplish the cutting.

4. The method of claim 3 including the step of separating the axes of the two cylindrical cutting dies used in the two cutting steps by a distance no greater than the sum of the diameters of the two cylindrical cutting dies.

5. A method as claimed in any of claims 1–4 including the step of selecting the first and second liners such that the first release force is greater than the second release force.

6. Apparatus for producing internally apertured pressure-sensitive labels removably adhered to a continuous flexible nonapertured liner, comprising:
   a). means for advancing to a first cutting station a continuous flexible label web removably adhered to a continuous flexible first liner;
   b). aperture cutting means at the first cutting station for defining at least one aperture for each label by cutting through the label web only but not through the first liner, to thereby produce aperture slugs separate from the label web;
   c). means for removing the first liner, with the aperture slugs adhered thereto, from the label web by advancing the label web in a first plane and the first liner in a second plane which diverges from the first plane;
   d). means for bringing a continuous flexible second liner into removably adherent contact with the label web after the first liner and aperture slugs have been removed from the label web;
   e). means for advancing the label web and adhered second liner to a second cutting station;
   f). periphery cutting means at the second cutting station for defining the peripheral shape of each label by cutting through the label web only but not through the liner, to thereby form individual labels separate from the label web; and
   g). means for removing the label web from the second liner to thereby leave the individual labels adhered to the second liner.

* * * * *